(No Model.)

G. W. WILLOUGHBY.
HORSESHOE.

No. 556,653.      Patented Mar. 17, 1896.

Inventor
George W. Willoughby,

Witnesses

By his Attorneys,

C. A. Snow & Co.

UNITED STATES PATENT OFFICE.

GEORGE W. WILLOUGHBY, OF ROCHESTER, NEW HAMPSHIRE.

HORSESHOE.

SPECIFICATION forming part of Letters Patent No. 556,653, dated March 17, 1896.

Application filed August 3, 1895. Serial No. 558,157. (No model.)

*To all whom it may concern:*

Be it known that I, GEORGE W. WILLOUGHBY, a citizen of the United States, residing at Rochester, in the county of Strafford and State of New Hampshire, have invented a new and useful Horseshoe, of which the following is a specification.

My invention relates to horsehoes, and has for its object to provide a steel racing or trotting shoe which is light in weight and affords the maximum seat for the hoof, the fall or rim being so constructed as to prevent slipping upon a moist surface and avoid the stinging effect produced upon the hoof in fast driving when a flat-faced shoe is employed, to provide an improved form of crease in which the nail-holes are formed, whereby the nail-heads are protected, the holes being so arranged as to approximately follow the inclination of the walls of the hoof at the different points to obtain a secure hold upon the hoof, and furthermore, to provide means for preventing the shoes from cutting when the horse interferes.

Further objects and advantages of this invention will appear in the following description, and the novel features thereof will be particularly pointed out in the appended claims.

Figure 1:
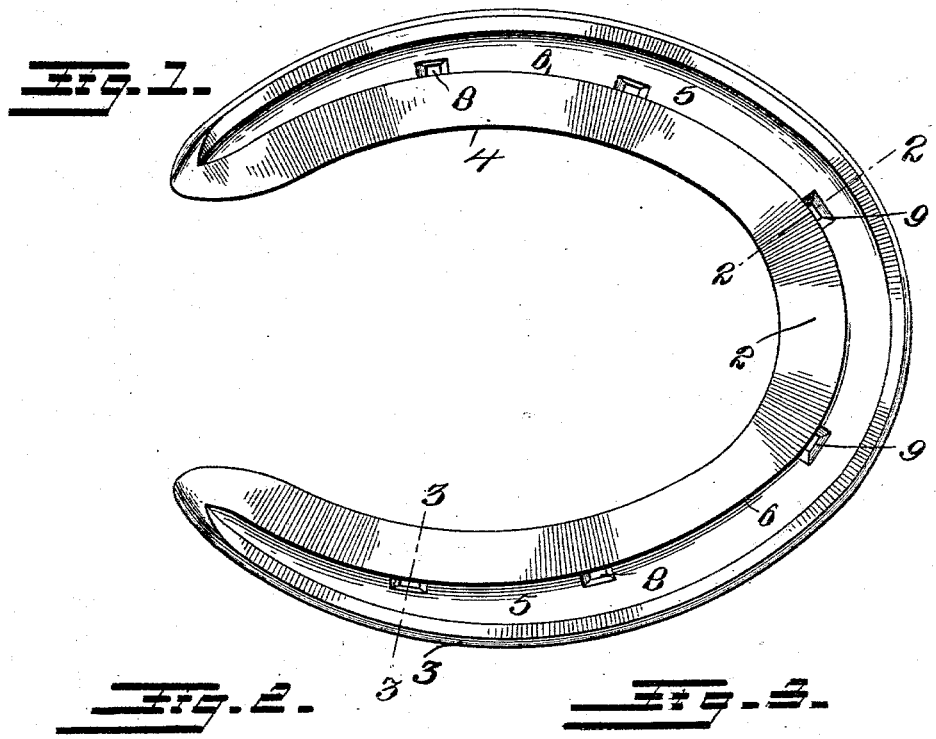
Figures 2, 3:
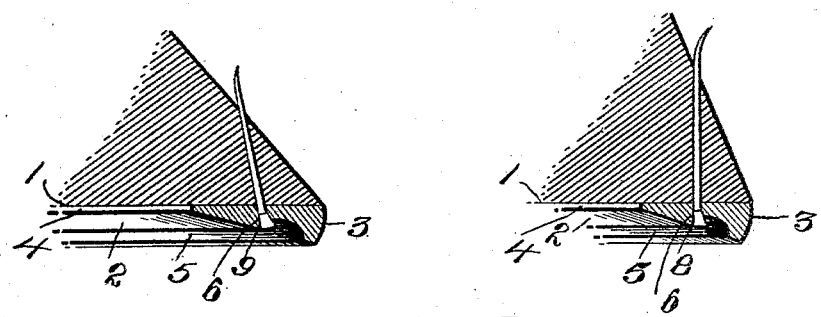
Figure 4:
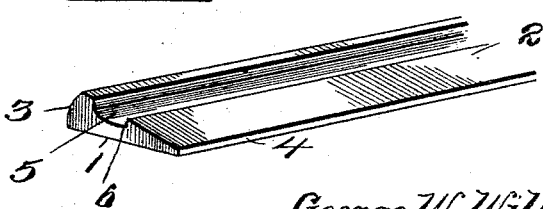

In the drawings, Figure 1 is a bottom plan view of a shoe constructed in accordance with my invention. Fig. 2 is a section on the line 2 2 of Fig. 1 through one of the front nail-holes, showing the contiguous portion of the hoof. Fig. 3 is a section on the line 3 3 of Fig. 1 through one of the side nail-holes, showing the contiguous portion of the hoof. Fig. 4 is a detail view, in perspective, of a portion of the blank from which the improved horseshoe is formed.

Similar numerals of reference indicate corresponding parts in all the figures of the drawings.

The shoe is provided with a flat upper side or seat, 1, and a continuously inclined or beveled lower side or tread, 2, said inclination extending from the outer surface or edge, 3, continuously to the inner edge, 4, where it intersects the upper surface or seat. Said outer edge, 3, is convexedly rounded to avoid cutting when the horse interferes, the general direction of the curve being inward toward the lower surface or tread of the shoe.

In the lower inclined or beveled surface or tread of the shoe and parallel with the outer edge thereof is formed a crease 5 of concaved construction, with the outer edge thereof merging gradually into the lower surface or tread, and the inner side formed abruptly to provide a shoulder 6, against which the flat sides of the nail-heads bear, as indicated in Figs. 2 and 3.

The narrow surface between the point of intersection of the outer side of the crease with the lower surface or tread of the shoe forms the fall or rim upon which the impact of the shoe in striking the track occurs, this fall or rim being the only portion of the lower surface of the shoe which comes in contact with the surface of the ground, except when the latter is sufficiently soft to allow the shoe to sink slightly, and the surface of said fall or rim is inclined in common with the main portion of the lower surface or tread of the shoe and in the same plane therewith. The broad shallow crease which is arranged between this narrow fall or rim and the main portion of the lower surface or tread of the shoe has the effect of reducing the surface of the shoe which comes in contact with the ground, and at the same time reduces the weight of the shoe, whereby a seat of the desired width to properly protect the hoof may be employed without adding to the weight of the shoe. Furthermore, inasmuch as the outer side of the crease approaches the surface of the fall or rim at an obtuse angle and the outer edge of the shoe is curved inwardly toward the plane of the face of said fall or rim, the general cross-sectional shape of the fall or rim is that of a wedge, and this wedge-shaped or tapered construction causes the fall or rim when it sinks into the surface of the track to enter the same gradually, whereby the sharp jar caused by a flat-faced shoe and the consequent stinging of the hoof are avoided.

From the above description it will be seen that the lowermost point of the rim or fall is the extreme outer edge thereof or the point of intersection of the surface of the rim or fall with the outer convexed edge, 3, of the shoe, and the angle thus formed serves to prevent slipping and at the same time adds to the wedge-like action of the shoe in entering the surface of the track.

The rounded cross-sectional construction of the crease prevents the holding of sand and gravel therein, as does the continuously-beveled under surface or tread of the shoe, whereby the inconvenience due to the throwing of sand or gravel by the hoof when the horse is in rapid motion is avoided.

The nail-holes 8 which are formed at the sides of the shoe are arranged approximately perpendicular to the seat or upper surface, as clearly shown in Fig. 3, whereby the nails approximately follow the inclination of the sides of the hoof and puncture or pass through the walls thereof at a sufficient distance from the bottom of the hoof to secure a firm engagement of the nail therewith, and the nail-holes 9 at the front of the shoe are inclined rearwardly toward the upper surface or seat of the shoe for a similar purpose, a further advantage of the inclination of the front nails being that they are arranged approximately in the line of the stroke or impact of the hoof with the track in descending thereon, whereby transverse strain upon said nails is prevented.

In constructing the shoes embodying my invention I preferably employ a blank of the construction illustrated in Fig. 4, in which the lower surface or tread, the rim or fall, the crease, and the upper surface or seat are arranged as above described, whereby the smith may cut the blank to form sections of the desired length and bend the same to fit the hoof, as in a shoe of the ordinary construction, the extremities of the blank being tapered and rounded, as illustrated in Fig. 1, and the nail-holes being formed in the manner above described to suit the positions thereof in the shoe.

Various changes in the form, proportion, and the minor details of construction may be resorted to without departing from the spirit or sacrificing any of the advantages of this invention.

Having described my invention, what I claim is—

1. A horseshoe having a flat horizontal upper surface or seat, an outer edge which inclines inwardly toward the lower surface of the shoe, and a lower surface or tread which is inclined or beveled continuously from its point of intersection with said outer edge to its point of intersection with the upper surface or seat, a crease being formed in said lower surface or tread parallel with the outer edge to form a narrow rim or fall having a face which inclines downward toward its point of intersection with the outer edge of the shoe, substantially as specified.

2. A horseshoe having a flat horizontal upper surface or seat, a downwardly and inwardly curved outer edge, a lower surface or tread which inclines continuously upward from its point of intersection with said outer edge to its point of intersection with the upper surface or seat, a crease formed in said lower surface or tread parallel with the outer edge to form a narrow rim or fall having an inclined face in common with the portion of the tread between the crease and the inner edge of the shoe and arranged in the same plane therewith, the inner side or wall of the crease being abrupt to form a shoulder and the outer side thereof being concaved and approaching the face of the rim or fall at an obtuse angle, and nail-holes arranged in the crease with their inner sides flush with the abrupt inner wall or shoulder of the latter, the front nails being inclined rearwardly toward the upper surface or seat to cause the nails driven therethrough to follow approximately the inclination of the front side of the hoof, substantially as specified.

3. A horseshoe having a beveled or inclined lower surface or tread, the inclination being continuous and in a common plane from the outer to the inner edge of the shoe, and a crease formed in said lower surface or tread to form a narrow-faced rim or fall contiguous to the outer edge of the shoe, the cross-sectional construction of said rim or fall being wedge-shaped or tapered toward its face or lower surface, substantially as specified.

In testimony that I claim the foregoing as my own I have hereto affixed my signature in the presence of two witnesses.

GEORGE W. WILLOUGHBY.

Witnesses:
J. LEIGHTON DUNTLEY,
WELBUR L. DUNTLEY.